March 26, 1935. J. S. BAKER ET AL 1,995,699
METHOD OF TESTING HEAT MOTORS FOR LEAKS
Filed Sept. 23, 1932
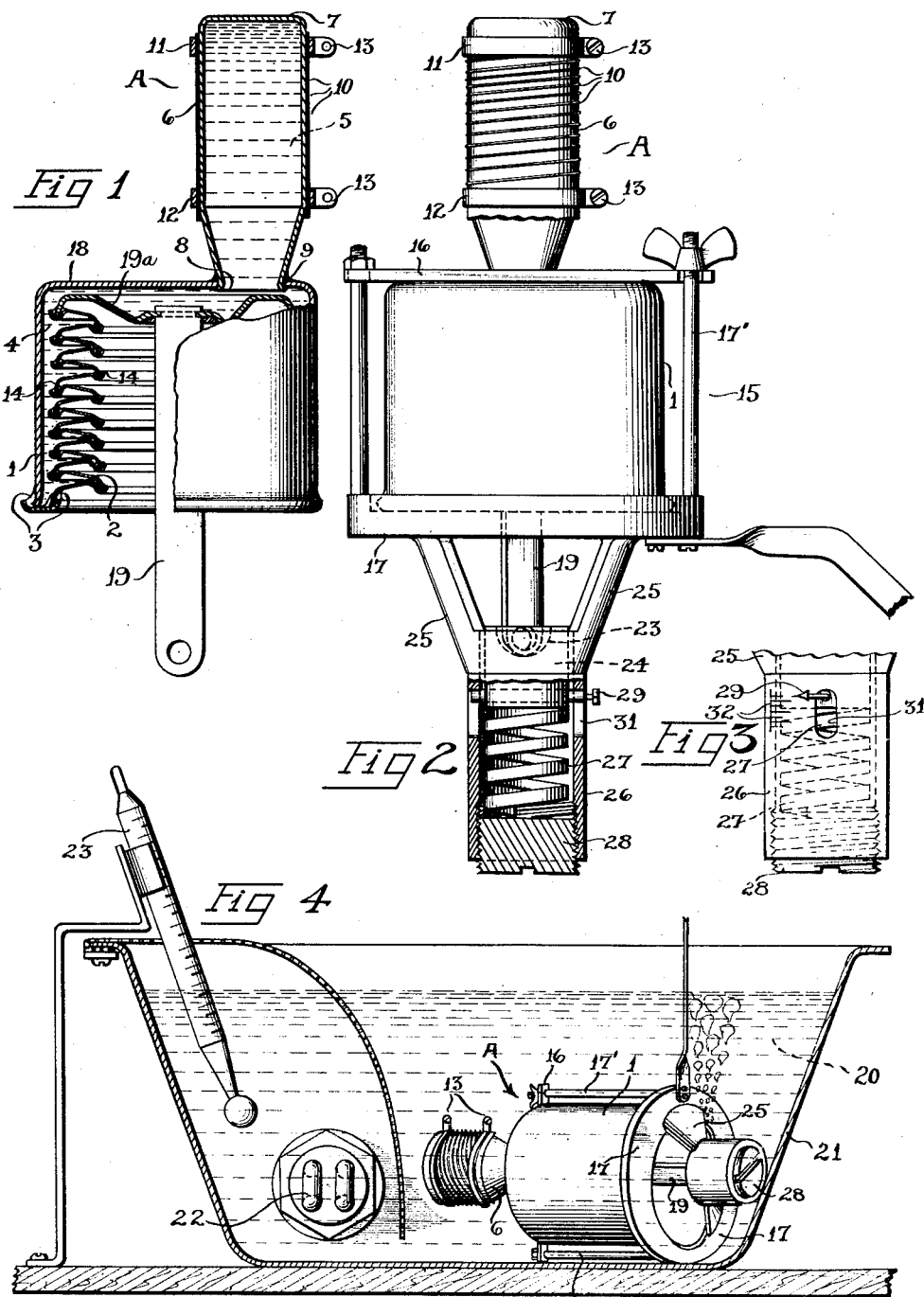

Patented Mar. 26, 1935

1,995,699

UNITED STATES PATENT OFFICE 1,995,699

METHOD OF TESTING HEAT MOTORS FOR LEAKS

John S. Baker and Roy M. Schultz, Chicago, Ill., assignors to Cook Electric Company, Chicago, Ill., a corporation of Illinois Application September 23, 1932, Serial No. 634,510

4 Claims. (Cl. 73—51)

This invention relates to an improved method of testing for leaks in vessels containing a volatile liquid, and more particularly to a method capable of detecting leaks or flaws, and especially leaks or flaws which are normally unnoticeable until the vessels are placed in service and subjected to normal operating conditions.

Vessels of this type are usually filled with a volatile liquid which vaporizes when heated. The internal pressure developed is utilized to operate working parts in controls and other devices. If a loss of the volatile liquid occurs, the operating stroke of the vessel will vary and eventually the loss of power will render the vessel useless. It is found that quite often the metal wall of the vessel will be defective to the extent of breaking down only after the volatile liquid is vaporized to develop internal pressure. On the other hand, exceptionally small leaks will often go unnoticed, but due to high penetrating action of the volatile liquid, such leaks will gradually permit a loss of liquid which will seriously impair the operation of the vessel.

An object of the invention resides in providing a simple and expedient method of testing vessels of this type for leaks, flaws or defective portions comprising increasing the internal pressure of the volatile liquid by submerging the vessels in a hot liquid,—utilizing the heat of the liquid to expand the volatile liquid, and maintaining the hot liquid at a predetermined temperature, which, at atmospheric pressure, may be above the boiling point of the volatile liquid so that any escaping liquid will vaporize and expand many times in size as it rises to the surface of the liquid.

A further object of the invention is to provide a method of testing vessels adapted to contain a volatile liquid which includes broadly the step of utilizing a liquid in which the vessels are submerged at a temperature which, at atmospheric pressure, is above the boiling point of the volatile liquid.

A further object of the invention is to provide a method of testing vessels adapted to contain a volatile liquid which includes broadly the step of utilizing a liquid, in which the vessels are submerged, which is a non-solvent of the volatile liquid whereby to prevent absorption of the volatile liquid as it rises in vapor form to the top of the liquid.

A further object of the invention is to provide a method of testing vessels adapted to contain a volatile liquid which includes the step of increasing the internal pressure of the volatile liquid by the temperature of the liquid in which the vessels are submerged, which temperature—at atmospheric pressure, is sufficient to vaporize and many times expand the volatile liquid whereby to render noticeable the most minute leaks.

Other objects and advantages of the invention will be apparent from the following detailed description taken in connection with the accompanying drawing.

In the drawing:

Figure 1 is a view partly in section and partly in elevation of a heat motor;

Fig. 2 is a view illustrating this heat motor held in a clamp before insertion in a hot liquid;

Fig. 3 is a detail view of a portion of the clamp; and

Fig. 4 illustrates diagrammatically the clamp and heat motor inserted in a vessel containing the hot liquid and having a heater and thermostat for maintaining a predetermined temperature.

By referring to the drawing in detail, it will be noted that we have illustrated an expansible or contractible vessel or heat motor A comprising a rigid outer wall 1, an expansible and contractible inner wall 2, hermetically sealed at the points 3 to outer wall 1. A closed chamber 4 is formed between these walls and is adapted to contain a body of volatile liquid 5, which may be of any kind suitable for the use to which heat motor A is put. It is mentioned that benzol and toluene have been found exceptionally useful for this purpose. Usually, the liquid employed is highly volatile, boils at a relatively low temperature, and is objectionably very penetrable, being capable of leaking through exceptionally small openings in the walls of the heat motor.

In the specific form of heat motor shown, a heating element is provided which comprises a vertical tube 6 having its upper end 7 closed and its lower end open at 8, but hermetically sealed at 9 to outer wall 1 so as to communicate with chamber 4. A resistance coil 10 may be wrapped about tube 6 with its ends connected at upper and lower terminal bands 11 and 12. Suitable terminal connections 13 are provided to connect heating coil 10 in a suitable control circuit.

It will be understood that in so far as the present invention is concerned, any form of heat motor is contemplated. In the form shown, however, the expansible and contractible wall 2 is formed of a plurality of discs or plates soldered together, or otherwise joined in hermetical relation at 14. It will be quite obvious that irrespective of the construction of the expansible and contractible wall 2, there will be numerous joints formed in the construction of the device, which must be hermetically sealed to prevent the escape of volatile liquid 5, but which will have leaks therein at times due to the difficulty of making the unions. The metal forming the contractible and expansible wall must be flexible and therefore quite thin, and consequently, in the manufacture of the contractible and expansible wall 2, defective portions will result. These defective portions are quite often unnoticeable until the device is assembled and is in service.

The method disclosed herein relates to determining such defective portions and minute leaks in advance of service use. Broadly, the method includes the steps of building up the internal pressure by expanding the volatile liquid, the vessel being submerged in a hot liquid of a temperature higher than the boiling point of the volatile liquid at atmospheric pressure, so that when this volatile liquid penetrates through the most minute openings or defective portions in the vessel, it will immediately vaporize and expand many times in size as it rises to the surface of the liquid, thereby making the smallest leaks readily noticeable during the testing.

It is contemplated holding vessel A in a clamp 15 while it is submerged in the hot liquid to restrict the expansion of the volatile liquid and thereby build up an internal pressure which will aid the penetrating action of the volatile liquid in causing an escape of the liquid at the leaks. Clamp 15 may be of any suitable construction, but as illustrated comprises a movable upper jaw 16 resting against the upper face 18 of outer wall 1 and carried by posts 17′ extending from a plate 17 in which the vessel is seated. A power shaft 19 of vessel A is suitably secured to inner wall 19a of the expansible and contractible wall 2. This power shaft 19 is carried, however, by the clamp structure, that is, with its lower end engaging in a seat 23 of a block 24 adjustably carried by a depending bracket 25, to restrict the movement of wall 2 upon expansion of volatile liquid 5. With chamber 4, including the interior of tube 6, substantially completely filled with volatile liquid 5, submerging vessel A in hot liquid 20, such for example as water in tank 21 will cause the heat to expand the volatile liquid and build up a relatively great internal pressure. Any internal pressure in excess of that needed to carry out the method of testing may be prevented by allowing block 24 to ride within a sleeve 26 against the tension of a spring 27, which may be adjustably varied by a cap screw 28. Moreover, the internal pressure developed in vessel A may be indicated by a pointer 29 moving in a slot 31 and secured to block 24. The edge of slot 31 may be calibrated at 32 in terms of pounds, or otherwise, to cooperate with pointer 29.

Tank 21 may be of any construction, there being provided a heater 22 and a thermometer 23 to indicate the temperature of water 20, so that it may be kept, say for example at or above 180° Fahr. If benzol is used as the volatile liquid 5, any temperature above 180° Fahr. will be in excess of the boiling point of the benzol at atmospheric pressure so that the benzol escaping into the water 20 will rapidly vaporize and expand considerably. While it remains in chamber 4, it will continue in the state of a liquid, although subjected to the temperature of water 20. This is due to the fact that the heat will build up a relatively high internal pressure in chamber 4, while vessel A is held in clamp 15.

In Fig. 4 the vessel A is shown in clamp 15 and submerged in hot water 20. For the purpose of illustration, we have shown the manner in which volatile liquid 5 will leak at a defective point in vessel A and vaporize and expand many times in size to readily indicate the most minute leak.

It will be understood that this method may be uniquely applied to testing other types of liquid containing vessels, although it has special application to the testing of heat motors containing a volatile liquid. We do not intend to limit the hot liquid 20 to water. It is found, however, that benzol will not dissolve in water, and consequently the vapor bubbles rising to the surface will not be absorbed. If other kinds of liquids are used in lieu of water 20, the temperature at which the liquids will be maintained to accomplish the desired results may vary considerably.

We have specifically described one embodiment of the method, but do not intend to be limited to any specific sequence of steps. We have found, however, that the steps enumerated provide a unique method of detecting the leaks of the most minute size and even causes the volatile liquid to appear through defective portions that are usually unnoticeable until the heat motor is subjected to normal operation, and then only in certain cases after the device has been in operation for a period of time. However, it will be apparent to those skilled in the art that the method need only be limited to those steps as are necessary to accomplish the desired results.

We claim:

1. The method of detecting leaks in an expansible and contractible vapor motor containing a volatile liquid which comprises clamping the vapor motor in a fixture limiting the expansion of the vapor motor to develop a predetermined internal pressure of the volatile liquid when expanded, submerging the vapor motor in a testing liquid which is non-solvent of the volatile liquid, and heating the testing liquid to a temperature above the boiling pont of the voltaile liquid to expand the latter without substantial vaporization so that it may escape into the testing liquid through any leaks in the vapor motor and thereafter expand into vapor without being absorbed by the testing liquid.

2. The method of detecting leaks in an expansible and contractible vapor motor containing a volatile liquid which comprises submerging the vapor motor in a liquid bath which is a non-solvent of the volatile liquid, heating the liquid bath to a temperature above the boiling point of the volatile liquid, and limiting the expansion of the submerged vapor motor to obtain a predetermined pressure of the volatile liquid therein without vaporizing it so that it may escape through any leak in the vapor motor into the liquid bath and then expand into vapor without being absorbed by the liquid bath.

3. The method of detecting leaks in an expansible and contractible vapor motor containing a volatile liquid which comprises submerging the vapor motor in a liquid bath which is substantially a non-solvent of the volatile liquid, heating the volatile liquid in the vapor motor while submerged in the liquid bath to a temperature above the boiling point of the volatile liquid, and limiting the expansion of the vapor motor when the volatile liquid is heated to prevent substantial vaporization thereof so that it may escape as a liquid into the liquid bath through any leak in the vapor motor and then expand into a vapor without being absorbed by the liquid bath.

4. The method of detecting leaks in an expansible and contractible vapor motor containing a volatile liquid which comprises submerging the vapor motor in a liquid bath which is substantially a non-solvent of the volatile liquid, heating the volatile liquid in the vapor motor while submerged in the liquid bath to a temperature above the boiling point of the volatile liquid, and holding the vapor motor while submerged in a fixture limiting the expansion of the vapor motor to develop an internal pressure preventing substantial vaporization of the volatile liquid so that the volatile liquid may escape as a liquid into the liquid bath through any leak in the vapor motor and then expand into a vapor without being absorbed by the liquid bath.

JOHN S. BAKER.
ROY M. SCHULTZ.